US012782599B2

(12) United States Patent
Yang

(10) Patent No.: US 12,782,599 B2

(45) Date of Patent: Nov. 3, 2026

(54) REMOVING NOISE INDUCED BY MOTION FROM COLLECTED WELLBORE DATA

(71) Applicant: Halliburton Energy Services, Inc., Houston, TX (US)

(72) Inventor: Jie Yang, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 522 days.

(21) Appl. No.: 18/216,319

(22) Filed: Jun. 29, 2023

(65) Prior Publication Data

US 2025/0004159 A1 Jan. 2, 2025

(51) Int. Cl.

*G01V 3/38* (2006.01)
*G01V 3/32* (2006.01)

(52) U.S. Cl.

CPC . *G01V 3/38* (2013.01); *G01V 3/32* (2013.01)

(58) Field of Classification Search

CPC ... G01V 3/38; G01V 3/32; G01V 3/18; G01V 3/00

See application file for complete search history.

(56) References Cited

U.S. PATENT DOCUMENTS 6,633,816 B2 * 10/2003 Shirasaka ............. E21B 47/022 702/6
2010/0307742 A1 * 12/2010 Phillips ................. E21B 47/022 166/250.01
2016/0018555 A1 * 1/2016 Jachmann ................ G01V 3/32 324/303
2016/0202384 A1 7/2016 Utsuzawa et al.
2021/0270990 A1 9/2021 Yang et al.
2021/0363875 A1 * 11/2021 Chanpura ............. E21B 47/024
2022/0365242 A1 11/2022 Jachmann et al.

FOREIGN PATENT DOCUMENTS

EP 1384097 B1 4/2007

OTHER PUBLICATIONS

International Search Report & Written Opinion; PCT Application No. PCT/US2023/026680; mailed Mar. 22, 2024.

* cited by examiner

*Primary Examiner* — Mohamed Charioui

(74) *Attorney, Agent, or Firm* — NOVAK DRUCE CARROLL LLP

(57) ABSTRACT

Described herein are systems, apparatuses, processes (also referred to as methods), and computer-readable media (collectively referred to as “systems and techniques”) for improving accuracy of determinations made using data sensed in a wellbore. Different types of sensing devices may be used to collect data used to identify structures of formations within the Earth. Examples of such sensing devices include sonic/ultrasonic sensing devices, electromagnetic sensing devices, and nuclear magnetic resonance (NMR) sensing devices. These sensing devices may be deployed when a wellbore is being drilled, after the wellbore has been drilled, or both. Evaluations performed during such operations may identify types of strata included in subterranean formations. Alternatively, or additionally, these evaluations may be used to identify locations where substances may be extracted from (e.g., oil, natural gas, or water) a formation or where substances may be injected into a formation (e.g., during a hydraulic fracturing or carbon sequestration process).

20 Claims, 8 Drawing Sheets

REMOVING NOISE INDUCED BY MOTION FROM COLLECTED WELLBORE DATA

TECHNICAL FIELD

The present disclosure is generally directed to improving the accuracy of tools deployed in a wellbore. More specifically, the present disclosure improves the accuracy of determinations made using sensed data by reducing noise from the sensed data.

BACKGROUND

When managing oil and gas drilling and production environments (e.g., wellbores, etc.) and performing operations in such production environments, sensor data is often collected and evaluated to make determinations on how to manage a wellbore. Such sensor data may be used to understand downhole conditions and materials that are located in a wellbore. For example, sensor data can be used to identify features associated with Earth formations. Evaluations performed on such sensed data may be used to identify locations where hydrocarbons may be extracted from those Earth formations. Conditions associated with a wellbore operation can create significant challenges in interpreting data collected by sensors.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1A:
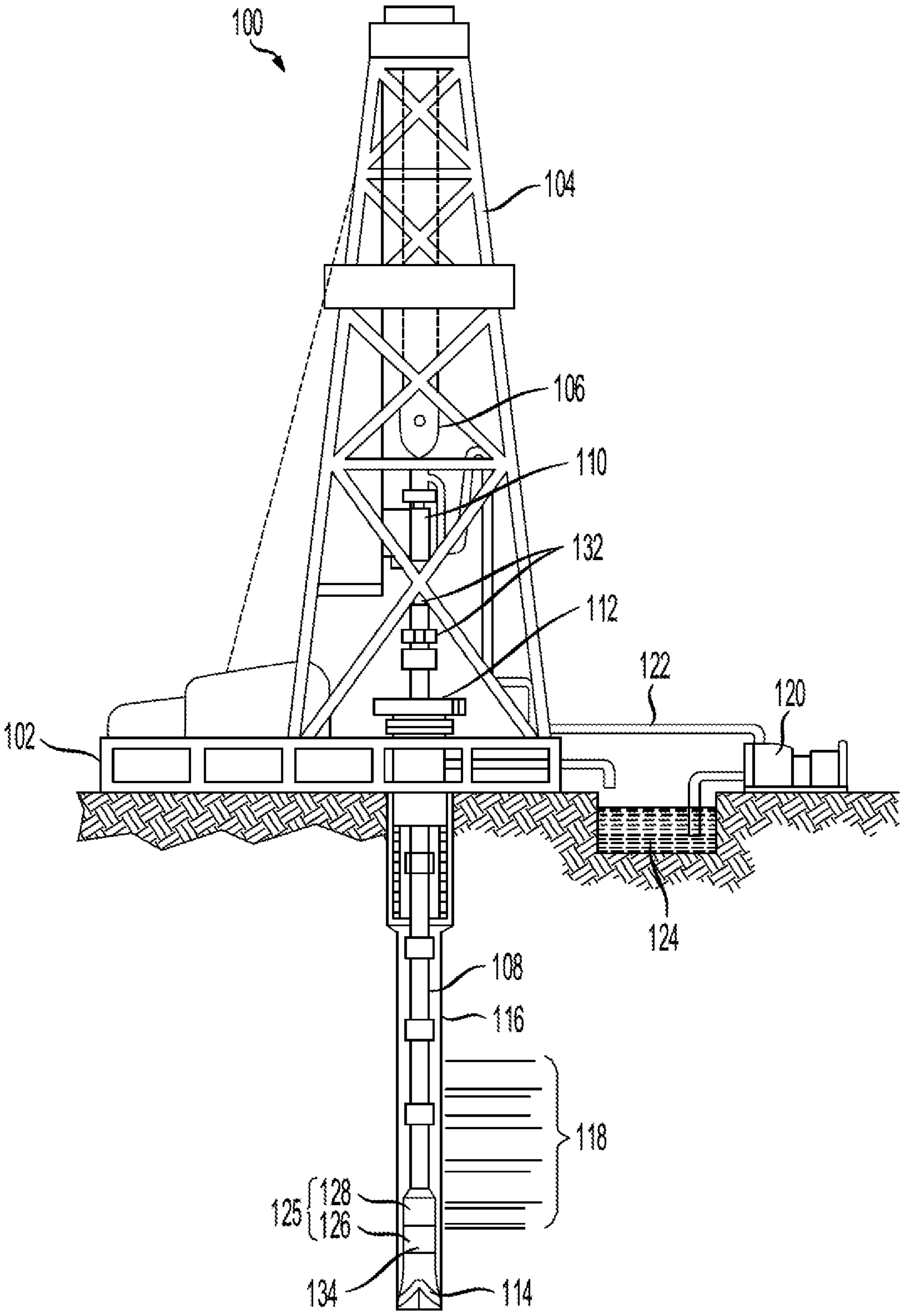
FIG. 1A is a schematic diagram of an example logging while drilling wellbore operating environment, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous compounds. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

Described herein are systems, apparatuses, processes (also referred to as methods), and computer-readable media (collectively referred to as "systems and techniques") for improving an accuracy of determinations made using data sensed in a wellbore. Different types of sensing devices may be used to collect data used to identify structures of formations within the Earth and gain insights about the formations and conditions within a wellbore. Examples of such sensing devices include sonic/ultrasonic sensing devices, electromagnetic sensing devices, and nuclear magnetic resonance (NMR) sensing devices. These sensing devices may be deployed when a wellbore is being drilled, after the wellbore has been drilled, or both, and can be placed at various locations within the wellbore, on a surface of the wellbore, and/or relative to the wellbore. Evaluations performed during such operations may identify types of strata included in subterranean formations. Alternatively or additionally, these evaluations may be used to identify locations where substances (e.g., oil, natural gas, or water) may be extracted from a formation or where substances (e.g., fracturing fluids, drilling mud, or carbon dioxide) may be injected into a formation. These evaluations may be used to identify locations within a wellbore where a threshold level of hydrocarbons may be extracted, as well as other information about the wellbore, the wellbore operations, etc.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seismic sensors, gravity sensor, image sensors, etc.) that can acquire formation data, such as characteristics of the formation, components of the formation, etc. For example, the drilling arrangement shown in FIG. 1A can be used to gather formation data through an electromagnetic imager tool (not shown) as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
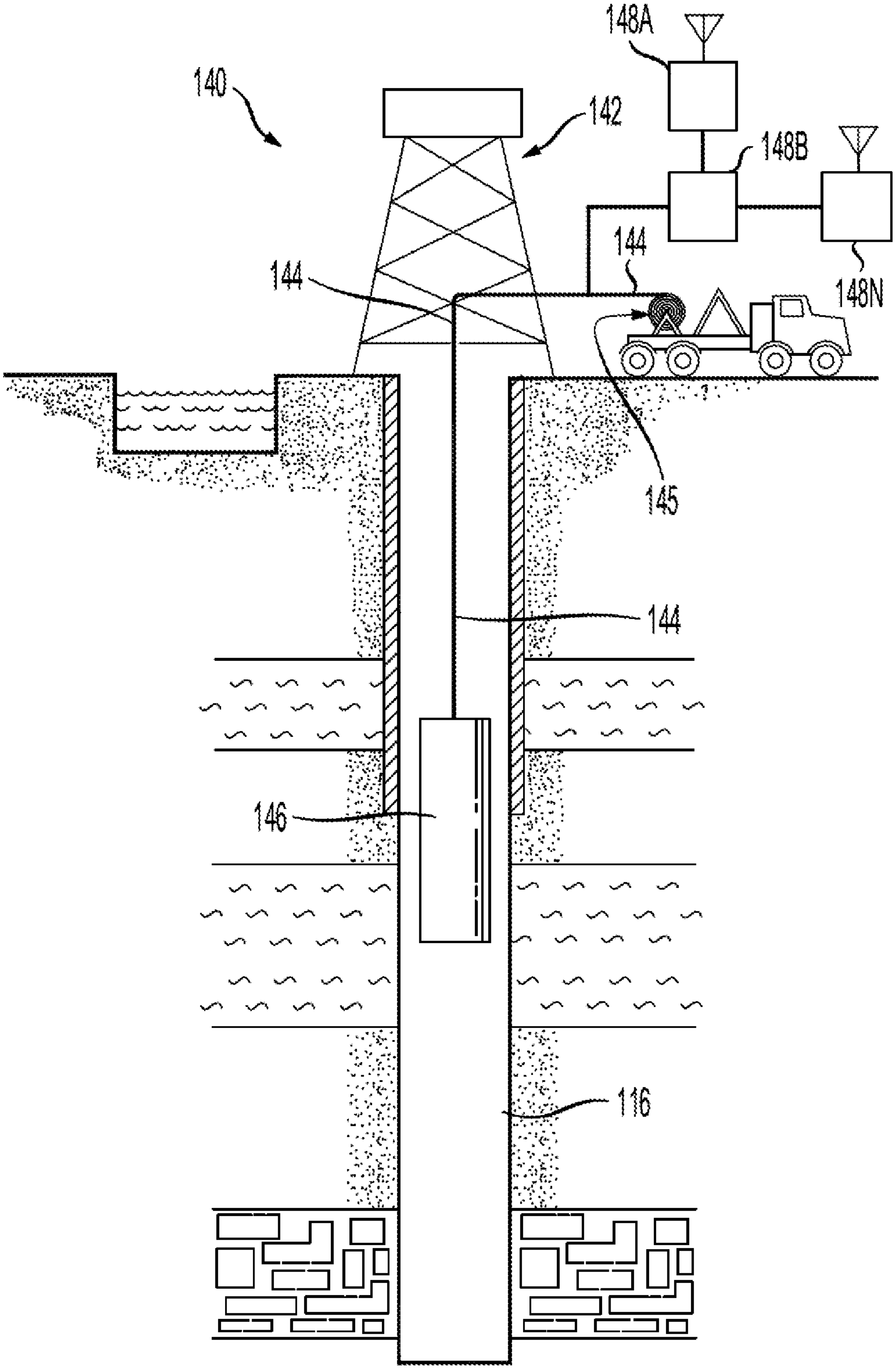
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. An electromagnetic imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

As mentioned above, one type of equipment that may be used to collect data in a wellbore is a nuclear magnetic resonance (NMR) sensing device. When an NMR sensing device is deployed in a wellbore, a magnetic field provided by a magnet of the NMR sensing device aligns at least some of the protons (e.g., protons of hydrogen atoms) in materials that are near the NMR sensing device. The spins of protons affected by the magnetic field may align in one of two directions, a first direction, the −½ spin state, that is associated with a first energy state and in a second direction, the +½ spin state, that is associated with a second energy state.

Figure 2:
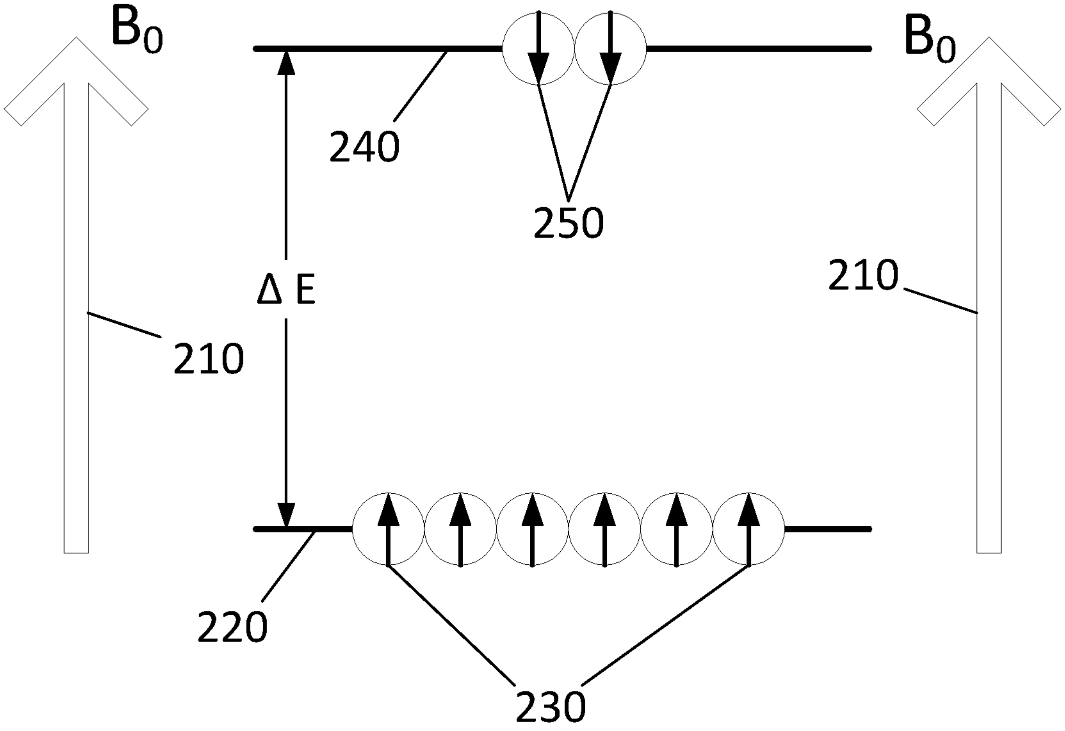
FIG. 2 shows how the directions of spins of protons included in a sample align when exposed to an external magnetic field, in accordance with various aspects of the subject technology.

FIG. 2 shows an applied magnetic field used to align the spins of protons of a sample. FIG. 2 includes magnetic field 210 that has a field strength $B_0$. When magnetic field 210 is applied to the sample and given sufficient time, affected protons in hydrogen atoms of the sample will align with the magnetic field 210 in either the −½ spin state or the +½ spin state. Protons 230 are illustrated as circles with arrows pointing in an upwards direction, these upward arrows indicate that protons 230 are in the +½ spin state. Protons 250 are illustrated as circles with arrows pointing in a downward direction, these downward arrows indicate that protons 250 are in the −½ spin state. Lines 220 and 240 are energy states respectively associated with spins of protons 230 and 250. A value of energy ΔE that separates the higher energy −½ spin state from the lower energy +½ spin state will increase with a value of applied magnetic field $B_0$. Note that there are more protons at the lower energy +½ spin state (e.g., protons 230) than protons that are at the higher energy −½ spin state (e.g., protons 250). The number of protons 230 at the lower energy state and the number of protons 250 at the higher energy state may correspond to a Boltzmann distribution, where the state distributions of protons at different energy states may vary as a function of temperature.

Before a magnetic field is applied to a sample, the spins of protons included in that sample may be randomly distributed and the sample may have a net magnetic field of zero. As mentioned above, when a sample is placed in a magnetic field, at least some protons within the sample will align with the magnetic field. The amount of time it takes for the spins of protons to settle into alignment with the magnetic field (T1 time) may vary based on specific compounds that are included in the sample. Some non-limiting, illustrative examples of alignment times include three seconds and five seconds.

Figure 3:
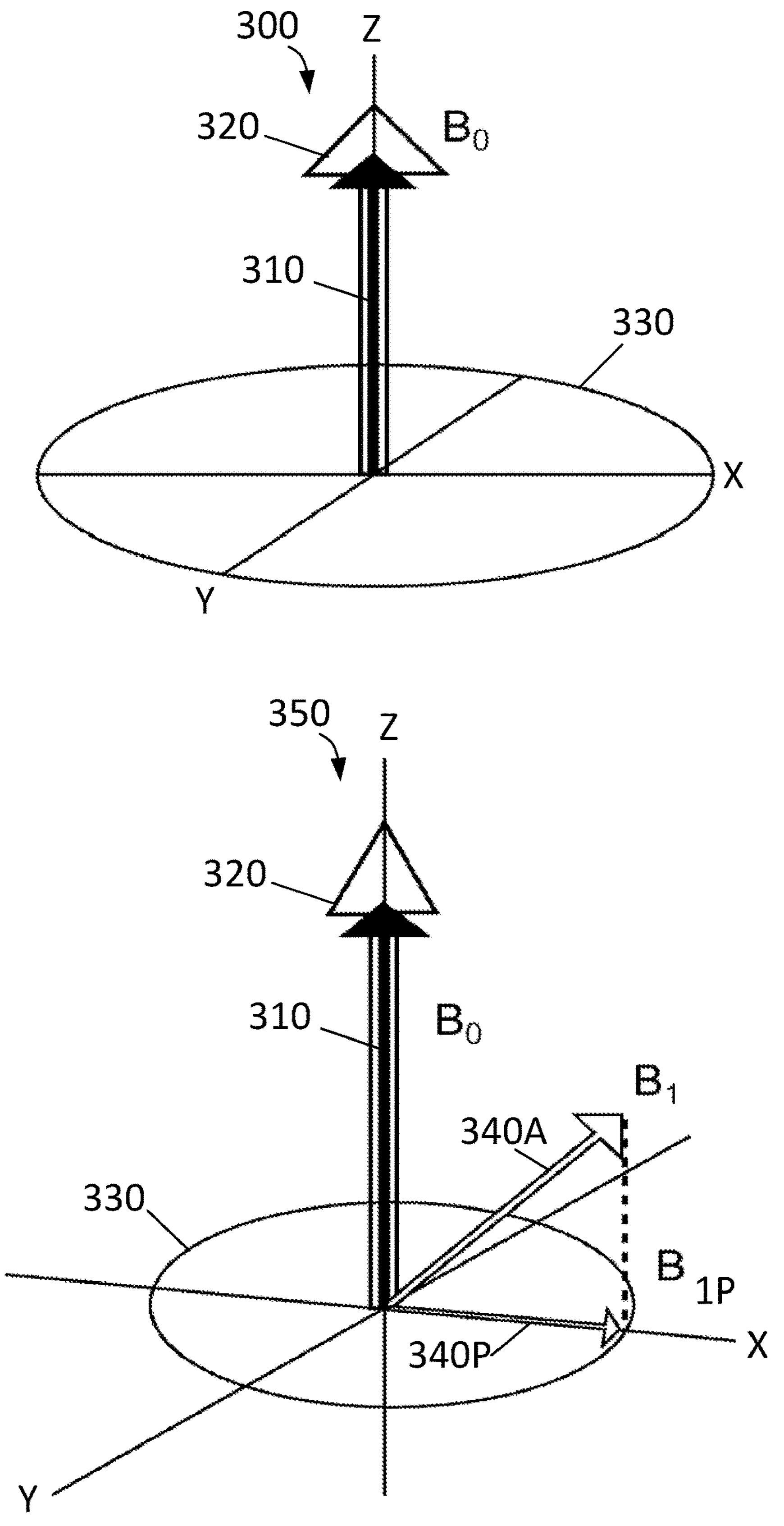
FIG. 3 includes a first image where a magnetic field aligns spins of protons in a sample and includes a second image where the spins of the protons in the magnetic field are disrupted by a radio frequency signal, in accordance with various aspects of the subject technology.

FIG. 3 includes two different images, a first image where proton spins of a sample are aligned with an applied magnetic field and a second image where proton spins of the sample have been disrupted by radio frequency signals transmitted by an NMR device. FIG. 3 includes image 300 where applied magnetic field 310 of field strength $B_0$ is used to align the spins of protons in a sample parallel to the Z axis of image 300. A magnitude of vector 320 in image 300 may correspond to net (total parallel magnetic moment (230) and total anti-parallel magnetic moment (250) of FIG. 2) magnetic moments of proton spins that are parallel to applied magnetic field 310. Image 300 also includes an X axis and a Y axis that form plane 330.

After the spins of protons included in the sample are aligned with applied magnetic field 310, RF signals may be emitted by the NMR sensing device. Magnetic fields associated with these RF signals may disrupt the spins of the protons in sample 310. A greater amount of energy of an RF pulse will result in a greater disruption of the proton spins. An amount of disruption in these spins may vary with a duration of the RF signal or with RF signal amplitude. Image 350 illustrates an instance where the net magnetic moment of spin is rotated with an offset angle from this Z axis as indicated by vector 340A. An angle associated with a change in spin direction may be referred to as a tipping angle. Antennas at the NMR sensing device sense changes in the spins of protons by measuring changes in electromagnetic fields along plane 330 may be referred to as RF field B1, 340P is the corresponding component perpendicular to B0, which is responsible for tipping proton spins.

RF signals with different energies may be used to disrupt the spins of protons by different amounts. The transmission of a first RF signal toward a sample may result in the angles of proton spins in the sample being changed by 90 degrees. As such, this first RF signal may be classified as a 90-degree RF signal pulse (or excitation pulse) that induces a 90-degree tipping angle. Similarly, the transmission of a second RF signal toward the sample may result in the angles of proton spins in the sample being changed by 180 degrees. Because of this, the second RF signal may be classified as a 180-degree RF signal pulse (or refocus pulse) that induces a 180-degree tipping angle. Since the tipping angle varies with RF signal energy or power, the 90-degree RF pulse may be twice as long or have twice the amplitude of the 180-degree pulse when tipping angle varies linearly with applied RF signal energy or power. NMR sensing devices may use other types of RF signal pulses. For example, a type of signal pulse that depolarizes (or randomizes) protons spins may be referred to as a chirp.

Operation of an NMR sensing device may include aligning protons in an applied magnetic field for a period of time, transmitting one or more RF signal pulses, and making one or more measurements by the NMR sensing device. This process may be repeated using different lengths of time period. Evaluations may then be performed to identify materials that are present in the sample based on known correspondences between the transmitted RF signal pulses and the measurements made by the NMR sensing device.

Permanent magnets can be used as a source of the applied magnetic field that an NMR device uses. The strength of a magnetic field of a permanent magnet varies with temperature. As temperature increases, the magnetic field strength of a particular permanent magnet will tend to reduce. Since environmental temperatures of a wellbore vary, the magnetic field strength of a magnet used in an NMR sensing device deployed in a wellbore will vary with the wellbore temperature.

A factor that changes with magnetic field strength is the resonate frequency of protons included within a sample. Since the magnetic field for a particular magnet varies with temperature, resonant frequencies associated with a particular NMR magnetic arrangement will change as temperatures change in a wellbore. This means that a change in temperature may affect operation of an NMR sensing device.

Since the spins protons of hydrogen atoms are affected by the applied magnetic field and energy from RF signals, certain compounds, such as compounds that include hydrogen will be sensitive to these applied magnetic fields ($B_0$) and applied RF signal energy ($B_1$). Different chemical compounds that include hydrogen are affected differently by such applied magnetic fields and RF energy. Furthermore, arrangements of hydrogen atoms in a sample may affect operation of an NMR sensing device. Because of this, NMR devices may be used to identify compounds that are located at specific wellbore locations and may identify characteristics of subterranean formations, such as pore size, porosity, and permeability from collected data. Conditions that occur in a wellbore may include temperatures and pressures that are significantly different than conditions at the surface of the Earth. For example, a temperature inside a wellbore may be 100 degrees Celsius (C) when a surface temperature is 25 C. When a wellbore is drilled, sensing equipment located in the wellbore may be exposed to noise and vibrations generated by a drill that drills the wellbore. Noise generated when a wellbore is drilled may interfere with determinations made using data sensed by sensing equipment of virtually any type (e.g., sonic, ultrasonic, electromagnetic, or NMR sensing equipment).

Equipment deployed in a wellbore may be sensitive to movement in either an axial (up/down) direction, a lateral (sideways) direction, or both. As discussed above, such movements and/or wellbore noise may reduce signal-to-noise ratios of sensing equipment deployed in a wellbore. When a wellbore is drilled, a drill bit and other equipment deployed in the wellbore can drill into the Earth at any of a range of different rates. For example, in some cases, when a wellbore is drilled, a drill bit and other equipment deployed in the wellbore can drill into the Earth at rates of about 30 feet per hour (ft/hr) to about 150 ft/hr. The rate at which the drill drills into the Earth in a direction parallel to the drill bit may be referred to as a rate of penetration (ROP) or movement along an axial direction of the wellbore. As the drill drills, noise may be generated for various reasons. For example, noise may be generated that corresponds to a number of revolutions per minute or RPM of the drill bit or an ROP of the drill bit. Noise may also be generated based on vibrations generated by the drill or that are generated when the drill bit cuts into or through materials of different hardness. Some vibrations may be associated with the RPM and/or the ROP of the drill and other vibrations may be associated with the drill bit bouncing off of hard materials in a subterranean formation. Even without drill related noise, movement of sensing equipment in the wellbore may interfere with sensing equipment as axial and/or lateral movement of sensing equipment can impact signal-to-noise ratios of LWD tools, wireline tools, NMR devices, or other sensing devices. Noise generated by a wellbore operation may interfere a computer's ability to discriminate between data from which determinations should be made and the noise generated by a wellbore operation because such noise inherently reduces signal-to-noise ratios of sensing equipment.

NRM sensing devices may be affected more severely than other sensing devices because signals sensed by NMR devices inherently have lower signal-to-noise ratios than signals sensed by other sensing devices. One reason for this is that the high temperatures change spin's according to the Bolzmann distribution. Another reason for this is that mechanical disruptions (e.g., shaking, acceleration, and/or vibration) may reduce sensitive samples volume.

To reduce measurement noises in a wellbore (e.g., noises associated with movement of a drill bit or other wellbore equipment), the systems and techniques described herein can be used to reduce motion and noise effects from data collected by an NMR sensing device in a wellbore. When a wellbore is drilled, sensing equipment may collect data that is used to identify properties of a wellbore. This collected data may include noise levels that may obscure characteristics that may be used to identify structures of, or materials located within, a wellbore. Commonly, as a wellbore is drilled, new pieces of pipe are added during drilling and possibly removed when pulling out. For example, a pipe segment may have a length of 90 feet (or any other length). After the drill bit drills the length of a pipe segment (e.g., 90 feet in the previous example), a new pipe segment may be added. At this time, drilling operations may be paused such that a new pipe segment may be attached to the drilling pipes. The new pipe segment may be attached to another using threads. When the drilling process is stopped or paused, motion-associated noise is no longer present, and motion that occurs is significantly reduced or eliminated. This means that collected wellbore data may be associated with "noisy times" (when the drill or other tool operates) and "quiet times" (when drilling or other operation is stationary, stopped or paused). Data collected during these noisy times may be referred to herein as "noisy data" or "motion data."

Data collected during quite times may be compared with data collected at same depth during noisy times after which motion data may be filtered based on determinations made using a computer model that compares quite data to motion data. Comparisons of the data acquired at noisy times and the data acquired at quite times at same depths may be used to identify functions that a computer model can use to filter portions of noise from the acquired noisy time data (e.g., to remove portions of noise from the acquired noisy time data). Because of this, systems and techniques of the present disclosure may be used to remove noise from datasets when computer modeling techniques are used to identify structures of, and materials located in a wellbore.

Figure 4:
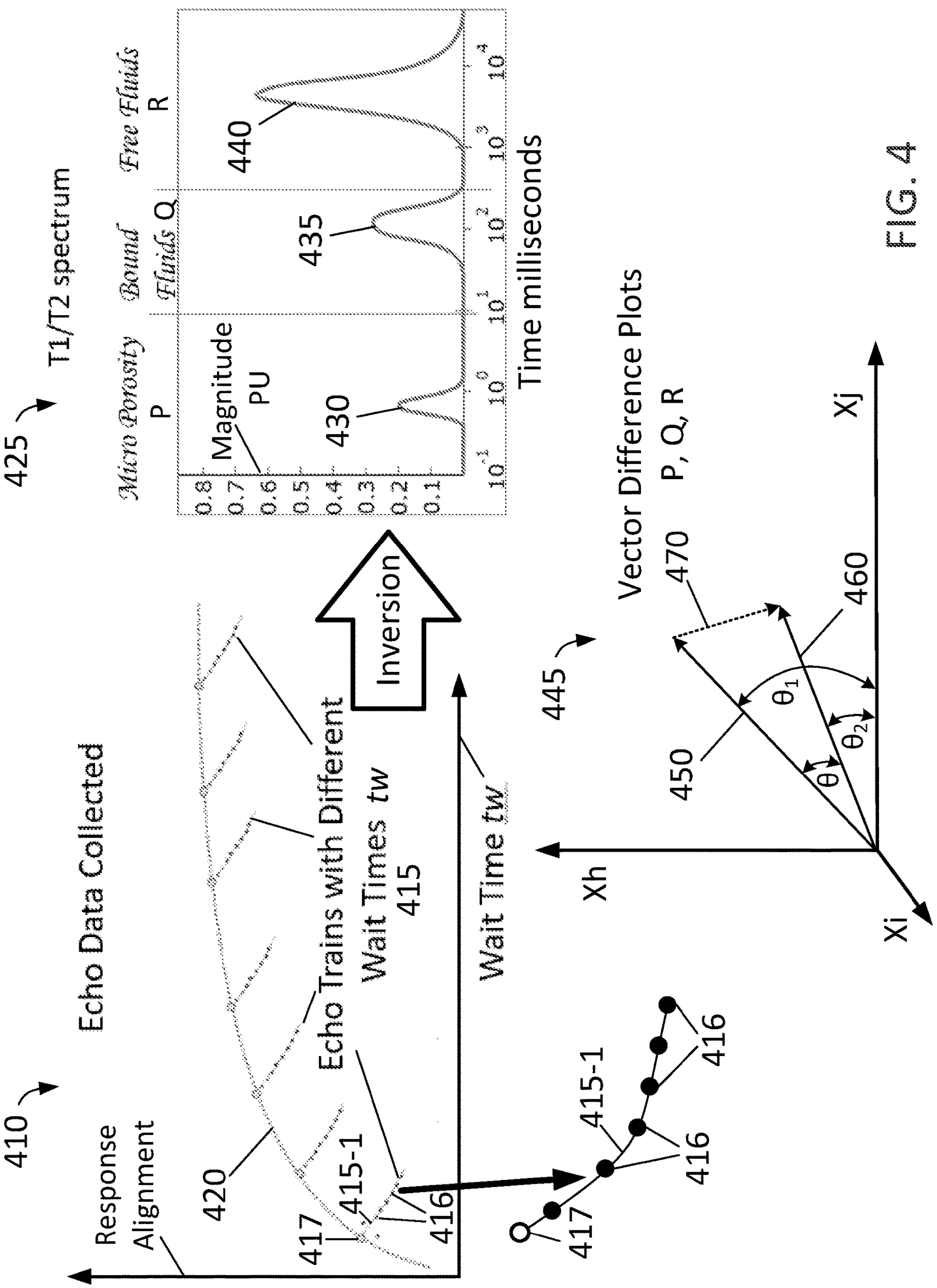
FIG. 4 illustrates several different graphs that may be generated from collected data such that noise may be reduced in the collected data in new ways, in accordance with various aspects of the subject technology.

FIG. 4 illustrates several different graphs that may be generated from collected data such that noise may be reduced in the collected data in new ways. FIG. 4 includes graph 410 that shows several different sets of collected echo train data 415 that may be used to generate T1 time (build-up) curve 420, graph 425 that shows a T1/T2 spectrum generated from evaluations performed on the collected echo data, and graph 445 that shows a vector difference plot generated from the T1/T2 spectrum data of graph 425 between noisy data and stationary data at a depth. When an NMR sensing device is deployed in a wellbore, a magnet of the NMR sensing device may be used to align the spins of protons in substances that are near the NMR sensing device magnet. As mentioned above, this may include exposing these substances to a magnetic field for a time referred to as the T1 buildup or alignment time. After the spins of these protons are allowed to align over the T1 buildup time, a burst or series of bursts of RF energy may be transmitted into the wellbore substances and responses to that transmitted RF energy may be measured by the NMR sensing device. The T1 buildup curve 420 may be a measure of build-up rate or alignment of protons in the Z direction after proton spins have been depolarized (randomized). T2 times may be a measure of the decay rate measured along the X-Y plane as indicated by echo trains 415.

Either a single RF pulse or a series of RF pulses with specific timing between them may be transmitted and the NMR device may then collect NMR data after the proton spins have been disrupted. The NMR signal observed after a pulse may be referred to the FID (free induction decay) signal. By using such pulses, an NMR sensing device may be used to measure chemical shift spectra which resolves the hyperfine interactions between different spin types. In a wellbore, a magnetic field will tend to have a natural gradient, and the NMR sensing device may be used to measure relaxation times of polarization (where proton spins move to align into equilibrium with the applied magnetic field) such that the T1 buildup curve 420 of FIG. 4 may be drawn. This may include measuring decay time (the fall off of measured signal over time) T2.

A basic sequence to measure T2 time may be to transmit an excitation pulse (90 degree pulse) followed by a series of refocusing pulses (180 degree pulse, for example). The timing between the refocusing pulses can be varied, yet for most sequences it may be kept the same such that echo data may be collected. An echo may be described as the deconvoluted and integrated signal between a set of refocusing pulses. Echo data may be recorded most often as the simplest form of the NMR data acquired downhole. For T1 measurement the sequence may start with an inversion or a saturation pulse (depolarization pulse) followed by a wait time. After the wait time a T2 pulse transmission sequence may be run. The process may then repeated for several different wait times allowing for different polarizations of magnetization to be measured.

Transmitted signals and responses may be measured using one or more antennas. A single antenna maybe used to excite a volume of rock and separate or multiple antenna used to receive the responses. A single antenna may be used to excite a volume and two or more antennas may be used to receive the response signal. Two orthogonal antenna's maybe used to excite proton spins. This excitation is known as circular polarization and has benefits of lowering the needed power to execute an NMR pulse sequence.

Since the wellbore may include different substances that have different properties and potentially different structures, different bursts of RF energy transmitted into those substances may result in different rates of change of spin of the protons of these different substances.

This means that once the spins of protons included in the materials that surround an NMR sensing device have been aligned along a Z axis, an RF signal burst may be provided to disrupt these spins. The NMR sensing device may then measure the amount of this disruption along a plane of the X-Y axes. Since the amount of disruption may vary with an amount of energy included in the RF signal pulse, the NMR sensing device may be configured to vary how much energy that is transmitted when evaluations are performed. The NMR sensing device may be configured to provide amounts of energy that corresponds to angles of proton spin disruption. The energy included in a first RF signal pulse may correspond to the amplitude of that first RF signal pulse and/or a number of periods included in that first RF signal pulse. In T2 sequence, this first RF signal pulse may be associated with a 90 degree angular disruption of the proton spins and a second RF signal pulse may be associated with a 180 degree angular disruption of the proton spins. The second RF signal pulse may have double the energy of the first RF signal pulse. This means that an NMR sensing device may vary how much power it transmits when that NMR sensing makes measurements. Yet another RF signal pulse may be referred to as an RF signal chirp that randomizes or depolarizes the proton spins at beginning of a sequence before the 1$^{st}$ pulse in T2 sequence to when a T1 sequence is performed. Such an RF signal chirp may include one or more frequencies of RF signals, may include numerous cycles of those signals, or may include a selected amplitude.

For a specific wait time, a T2 experiment or evaluation may transmitting the first (i.e., 90 degree) RF signal burst, then transmitting the second (i.e., 180 degree) RF signal burst, and then measuring the proton spin states. A T2 experiment or evaluation may also include transmitting one or more additional RF signals pulses and making proton spin state measurements for each transmitted RF signal pulse. Each of a set of measurements for a given wait time may be referred to as a set of echo data of an echo train 415. Points that lie on curve 420 cannot be measured directly because RF pulses are transmitted by an antenna of the NMR sensing device at this time. As such, points along curve 420 must be extrapolated from echo data collected after one or more RF signal pulses have been transmitted. This means that a location of point 417 of curve 420 may be identified by plotting curve 415-1 from measured data points 416 and interpolating the location of point 417 based on a wait time that corresponds to a time when RF pulses were transmitted from the NMR sensing device.

This process may be repeated for multiple different wait times, where each subsequent wait time is increased relative to a previous wait time. As such, the spins of the protons of the wellbore materials may be aligned multiple times and the pulses of RF energy be transmitted after each respective wait time such that a different set of echo data may be collected. Once multiple sets of echo data are collected, curve 420 can be generated from this collected data.

The rate at which curve 420 rises and flattens out may be indicative of types of materials and/or structures of those materials that are present at particular locations of the wellbore. This means that the shape of a curve as well as characteristics of measured echo data are associated with structures and materials present at a wellbore location. Initially, curve 420 rises relatively quickly and then curve 420 flattens out as wait times/w increase. The flattening of curve 420 indicates that B1 alignment buildup rate of magnetic spins reduces as wait time tw is increased. As mentioned above, the shape or curve 420 may correspond to materials and or structures located near the NMR sensing device. Curve 420 may be used to identify T1 times associated with materials located in a wellbore.

A mathematical process or set of calculations may then be employed to generate the T1/T2 spectrum plot of graph 425 from the sets of echo data. This mathematical process may be an inversion process performed by a computer model. A horizontal axis of graph 425 may be T1 buildup time or T2 decay time in milliseconds and a vertical axis of graph 425 may be magnitude with corresponding T1/T2 time (measured in porosity units). Porosity (PU) units may be a measure of the volume pores of a rock sample per volume of the rock sample. This inversion process may be used to plot different curves where each curve is associated with the different parameters and/or materials. The spectrum plot of graph 425 shows three different zones: curves 430, 435, and 440 that are each respectively associated with micro-porosity P, bound fluids Q, and free fluids R. Graph 425 indicates that there is a greater volume of free fluids as compared to bound fluids at this particular wellbore location. Magnitude values (summation of all vertical values in a 1$^{st}$ zone) of micro-porosity P, bound fluids Q (summation of a 2$^{nd}$ zone), and free fluids R (summation of a 3$^{rd}$ zone) may be used to identify locations were a substance (e.g., oil) can be readily withdrawn from a wellbore location based on the free fluid curve 430 being larger than bound fluid curve 435. Any datapoint on the curve: vertical values the signal amplitude, and corresponding horizontal value is either the build-up rate for T1 or decay rate for T2.

As mentioned above, collected data may include sets of motion data (or noisy data) and sets of stationary (or quiet) data. Since a wellbore drilling process may include drilling the wellbore over a length of a drilling pipe segment and may include pausing the drilling process when a new drilling pipe segment is installed or removed, a set of quiet wellbore data may be collected without or with fewer motion induced effects. While the wellbore operation is stopped or paused, a set of quiet data may be collected by the NMR sensing device. In an instance when the drilling pipe segments have a length of 90 feet, each respective set of quiet data may correspond to a 90-foot length of the wellbore. The quiet data collected when the wellbore drilling process is paused may result in a set of quiet data being collected that spans only a small portion of the wellbore. As a wellbore is drilled, drilling data may be acquired continually (for example, one whole T1 sample period of 20 s). This drilling data may include numerous processed values (e.g., 54 values). These numerous values may be partitioned into one of a micro porosity zone, a bound fluids zone, or a free fluids zone. Since the drilling operation may have an ROP of 30 ft/hr to 150 ft/hr, when this 20 second sample time span is used, means that many datasets will be collected when the wellbore is drilled to accommodate a next 90 foot section of pipe. In an instance, when the drilling operation is paused a small set of sample data may be collected and partitioned into one of the micro porosity zone, the bound fluids zone, or the free fluids zone. This means that a total amount of motion data collected may be much larger than a total amount of quiet data collected during a wellbore development process.

Different sets or portions of collected wellbore data may be associated with a micro-porosity vector, a bound fluid porosity vector, and/or a free fluid porosity vector. Such vectors may show how values of micro porosity P, bound fluids Q, and/or free fluids R change with depth. Because of this, for each length of a wellbore, three vectors may be identified from collected data. Graph 445 is a pictorial representation of vectors P, Q, and R of a multi-dimensional (or p-dimensional) space. While graph 445 illustrates three axes (Xi, Xj, and Xh) such representations may include other number of axes (e.g., Xi, Xj, Xk, and Xh). Vectors included in graph 445 are motion data vector (or noisy data vector) 450, and quiet data vector (or stationary data vector) 460 at same depth. One or more sets of P, Q, and R vectors may be generated for portions of motion data and one or more sets of P, Q, and R vectors may be generated for portions of quiet data. Since the quiet data includes less noise than the motion data, vectors generated from the quiet data should more accurately reflect changes in porosity, bound fluids, and free fluids located within the wellbore than vectors generated from motion data. This is because the motion data is inherently less accurate than the quiet data. In an instance when, 54 bin spectrum values are used, these values may be partitioned into 3 zones: micro-porosity may be associated with, for example 13 values represented as a 13-dimension vector P; bound fluids may be associated with, for example 21 values, represented as a 21-dimension vector Q; and free fluids may be associated with, for example 20 values on 425, representing as a 20-dimension vector R. The vectors shown in FIG. 4, 445, can represent either P, or Q, or R and they may have different dimension (or number of values).

Since vector 450 was generated from motion data during a drilling process and since vector 460 was generated from quiet data when the drilling process was paused, angle θ may correspond to an offset angle or error angle caused by noise of the drilling process. Each respective P, Q, and R vector may be offset at a different angle and have a different magnitude, where vectors generated from motion data have more error than vectors generated from quiet data. Because of this, the vectors generated from quiet time data may be used as a reference to correct the vectors generated from motion data. This means that vectors that indicate changes in micro-porosity, bound fluids, and free fluids generated from a set of motion data may be corrected by changing an angle and/or magnitude of these vectors. Such a correction may include offsetting these vectors by the angle θ's as indicated by dashed line 470. Graph 445 shows an example of drilling data at certain depth where both drilling data and stationary (quiet) data are collected. In FIG. 4, vector 450 has an angle of $\theta_1$ and vector 460 has an angle of $\theta_2$. From these two angles offset angle θ may be identified by identifying a difference between angle $\theta_1$ and angle $\theta_2$. Since collected data may be processed when generating three different parameter curves 430, 440, and 450 respectively related to micro-porosity P, bound fluids Q, and free fluids R, three different types of vectors may be mapped. As mentioned above, these vectors may include a micro-porosity vector, a bound fluids porosity vector, and a free fluids porosity vector porosity. As such, vectors generated from motion data may be referred to as micro-porosity vectors $P(\theta_1)$ or bound fluid vectors $Q(\theta_1)$, and free fluid vectors $R(\theta_1)$. Similarly, vectors generated from quiet data may be referred to as micro-porosity vectors $P(\theta_2)$, or free fluid vectors $Q(\theta_2)$, and free fluid vectors $R\cdot(\theta_2)$ angles ($\theta_P$, $\theta_Q$, and $\theta_R$) corrections may be identified using formulas such as: $\cos(\theta_P)=\mathrm{COS}(\theta_{1P}-\theta_{2P})$, $\cos(\theta_Q)=\mathrm{COS}(\theta_{1Q}-\theta_{2Q})$, and $\cos(\theta_R)=\mathrm{COS}(\theta_{1R}-\theta_{2R})$.

As such, methods of the present disclosure allow for vectors of motion data to be corrected by changing an angle and/or magnitude associated with these vectors to correspond to an angle of quiet (or stationary) vectors generated using quiet data. This correction process may result in different offset angles and/or magnitudes of micro-porosity, bound fluids, and free fluids being associated with different wellbore parameters, materials, or structures. As such, micro-porosity vectors, bound fluid porosity vectors, and/or free fluid porosity vectors of motion data may each have their own offset angle and/or magnitude that is used to correct the set of motion data.

Figure 5:
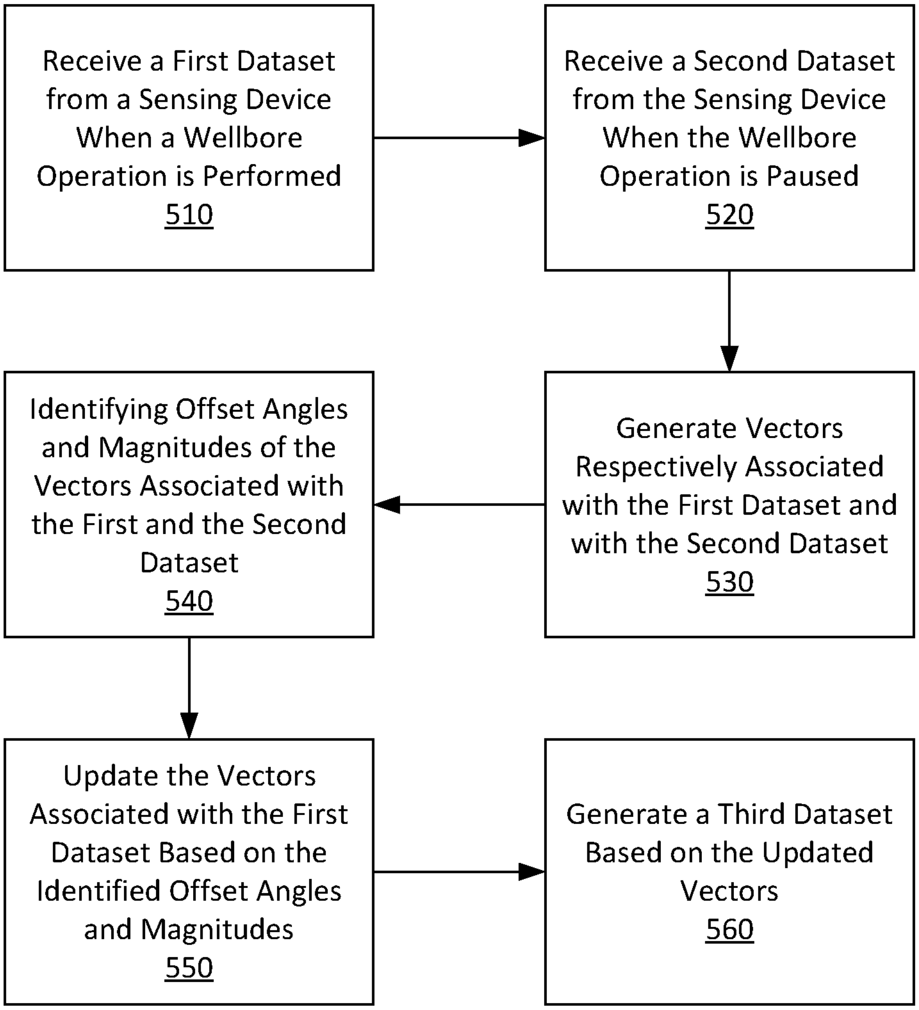
FIG. 5 illustrates an example process that may be performed when data is collected, evaluated, and corrected to increase the accuracy of determinations made from the collected data, in accordance with various aspects of the subject technology.

FIG. 5 illustrates an example process that may be performed when data is collected, evaluated, and corrected to increase the accuracy of determinations made from the collected data. At block 510, the process can include receiving a first dataset from a sensing device. This first set of data may be received and/or collected when a wellbore operation is performed. For example, data may be collected when the wellbore is drilled. Noise associated with such an operation may include noises generated based on an RPM of a drill bit drilling the wellbore, a rate of penetration (ROP) or axial motion of the drill bit along the wellbore, lateral motions of the drill bit, and/or vibrations that are generated when the drill bit operates. This means that the first (noisy) dataset will include different types of noise that may have different types of content that make determinations made using this motion data less accurate than determinations made using quiet data. The data received at block 510 may be filtered or corrected to remove portions of noise from the motion dataset. For example, noise associated with ROP motion, lateral (side-to-side motion), or other noise may be reduced using one or more filtering functions that are dedicated to filtering noise from acquired datasets and/or by correcting offset angles of vectors generated using noisy data.

At block 520, the process can include receiving, from the sensing device, a second (quiet) dataset when the wellbore operation is paused (e.g., at a time when a wellbore drilling operation is paused). As mentioned above, the drilling operation may be stopped or paused when a new piece of pipe is added to a wellbore casing. The second dataset can be collected when the wellbore operation is stopped or paused to add a new piece of pipe to the wellbore casing. Because this second dataset is collected when the wellbore operation is stopped or paused, it will not include the same amount and/or type of noise that was included in the first (noisy) dataset. This means that the second (quiet) dataset will not include noises generated by a motor RPM, the ROP axial motion, lateral motion, and/or vibrations generated by the drilling process.

When the wellbore operation is stopped or paused, sensing devices may remain at one location or may be moved up and down portions of the wellbore such that the second dataset (e.g., the set of quiet or stationary data) may be collected. This set of quiet data may include sensed data, that can span parts of the wellbore from which motion data (e.g., the first dataset) was previously collected. The data collected during noisy times may be compared with the data collected during quite times based on location. The set of quiet data may only include data collected from a location where the wellbore operation was stopped or paused or when the sensing device is moved slowly when a noisy wellbore operation is stopped or paused. In some examples, the set of quiet data collected from a location where the wellbore operation was stopped or paused can be compared with a set of motion data collected from the same location associated with the wellbore.

At block 530, the process can include generating vectors associated with the first dataset and with the second dataset. These vectors may each be associated with perceived changes in porosity, bond fluids, and free fluids over lengths of the wellbore. As mentioned above, since the first dataset was generated from data sensed when the wellbore operation was performed (when the wellbore was drilled), the vectors associated with the first dataset may be distorted because of noise (e.g., RPM, ROP or axial motion, lateral motion, and/or vibration noise) associated with a set of wellbore equipment. Since the second dataset was generated from data collected when the wellbore operation was paused (e.g., during a quiet or stationary time), micro-porosity, bond fluid, and free fluid vectors generated from the second dataset should more accurately correspond to changes in or measures of porosity, bond fluids, and free fluids in the wellbore.

Data from the first dataset may be processed and this processing may identify different properties or material characteristics of the wellbore. Processed data related to these different properties or material characteristics may be used to generate data from which the three curves 430, 440, and 450 of FIG. 4 are generated. Once this processed data is characterized as being related to one of several different specific properties or material characteristics, vectors for each one of these different specific properties or material characteristics may be identified. As such, the processing data from the first and/or dataset may be used to identify plots that could be used to estimate volumes (or volumetric densities) to associate with the properties or characteristics of micro-porosity, bound fluids, and/or free fluids. Further processing may identify vectors for each respective property or material characteristic.

As discussed with respect to FIG. 4, vectors generated from the second dataset may be used to correct data included in the first dataset by identifying offset angles to attribute to the data of the first dataset and the second dataset. Differences in offset angles associated with the first dataset and the second dataset for each respective type of material property or characteristic may be used to update the first dataset based on the differences in offset angles between a first set of vectors (associated with the first dataset) and the second set of vectors (associated with the second dataset).

As such, the vectors associated with the first dataset may be compared with the vectors associated with the second dataset to identify an offset angle and magnitude for each vector at block 540 as discussed in respect to FIG. 4. At block 550, the vectors associated with the first dataset may be updated based on the offset angles and/or magnitudes identified at block 540 using a process of interpolation. This interpolation process may include adjusting motion data from portions of the wellbore from which quiet data was not acquired and instead assume that quiet data from a small portion of the wellbore should generally correspond to data that was collected from wellbore locations during a noisy time. This means that a small amount of quiet data may be used to correct a large amount of motion data. Since the motion data may be collected over the length of a drilling pipe segment that may have a 90 foot length, motion data may be collected over a span were a drill drills that 90 foot length. Quiet data could then be collected when a new piece of pipe is placed in the wellbore over a relatively small length. In such an instance, collected stationary (quiet) data could be used to correct motion data collected over a 90 foot length.

A third dataset may then be generated at block 560 based on the vectors updates made at block 540. This third dataset could include updated motion data as well as the data collected at the quiet times. This third dataset may be evaluated to identify subsequent processes that could be performed at a wellbore.

By performing the actions of FIG. 5, decisions regarding how best to manage a wellbore may be identified. As mentioned above, this may allow for determinations to be made relating to where to extract hydrocarbons from or may be used to identify when or where a hydraulic fracturing operation should be performed before hydrocarbons are extracted from a wellbore. For example, in an instance when a wellbore location has a porosity of a given value and relatively greater measures of bound fluids as compared to free fluids, hydraulic fracturing may be used to break up rocks in the wellbore. This may result in a measure of bound fluids reducing and a measure of free fluids increasing.

Figure 6:
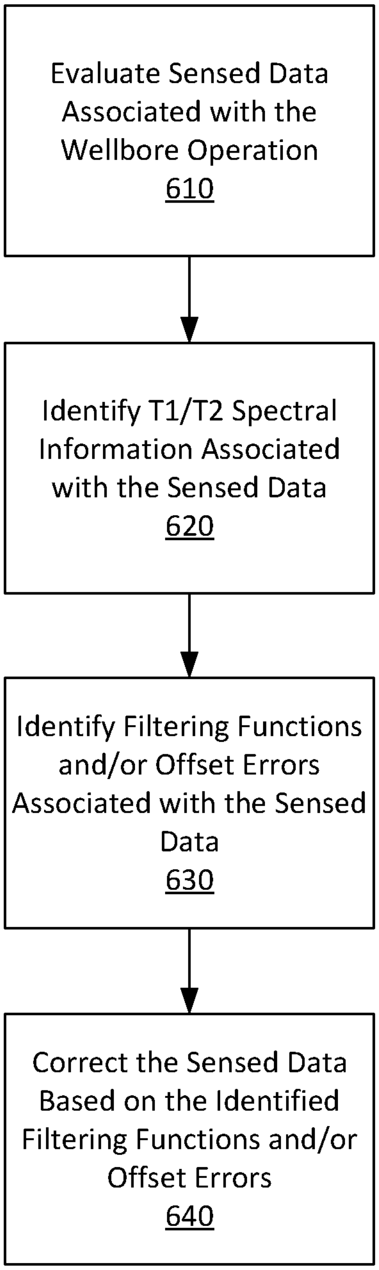
FIG. 6 illustrates another example process that may be performed when data is collected, evaluated, and corrected to increase the accuracy of determinations made from the collected data, in accordance with various aspects of the subject technology.

FIG. 6 illustrates another example process that may be performed when data is collected, evaluated, and corrected to increase the accuracy of determinations made from the collected data. At block 610, the process can include performing an evaluation on sensed data. At block 620, the process can include identifying, based on the evaluation, T1/T2 spectral information associated with the sensed data. In some examples, the evaluation can include performing Laplace (or Z) transforms on sets of motion data and performing Laplace (or Z) transforms on sets of quiet data. At least some of the characteristics of data collected at one or more noisy times (e.g., one or more times when a wellbore operation, such as a drilling operation, is performed) will be different from characteristics of data collected at one or more quiet times. This T1/T2 spectral data may be used to generate curves such as curves 430, 435, and 440 or to generate vectors disused above in respect to FIG. 4.

For example, noise associated with a drill bit RPM could include a base frequency that corresponds to the RPM (base-RPM frequency) and possibly harmonics of that base-RPM frequency. Each of the frequencies associated with the drill bit RPM may also have a magnitude. Since at a quiet time the drill bit is not spinning, data collected at the quiet time will not include the frequencies and magnitudes of the drill bit RPM noise. Given this, a computer model may be used to filter out frequencies that are uniquely associated with the RPM noise. Such evaluations may also be used to identify vectors as discussed in respect to FIGS. 4 and 5. This may include identifying offset angles or errors that are associated with collected motion data.

Data collected in the wellbore or when a sample is evaluated can be collected over time. Accordingly, data sensed by sensors can be collected in the "time domain." Laplace transforms (or Z) convert data collected in the time domain into the spectrum domain data.

In an instance when a set of quite data (e.g., data collected when one or more wellbore operations are paused or stopped) and a set of motion data (e.g., data collected when one or more wellbore operations are performed) both include spectral content, filtering functions may be adjusted to only filter out portions of that spectrum that are attributed to a specific noise source. For example, some early arrival signals (spectrum with certain low T1/T2 values) in micro porosity zone.

The transforms discussed above transform data into the spectrum domain such that T2 (delay)/T1 (buildup) time and magnitudes of respective T1/T2 times included in motion data sets and quite data sets may be compared when filtering functions are identified at block 630 of FIG. 6. In an instance when an RPM noise includes a signal of 2 ms delay in T2 spectrum or 2 ms buildup in T1 buildup, a magnitude of the at 2 ms signal spectral content observed in a set of quite time data may be subtracted from a magnitude spectral content observed in a set of noisy time data. In such an instance, the spectral content of the data observed at the quiet time may be relevant data. Such relevant data may be data from which determination regarding characteristics (e.g., pore size, porosity, bound fluids, free fluids, and/or permeability) of the wellbore can be identified. By performing this subtraction, a magnitude of the 62 ms spectral content associated with the noise may be identified. Once the filtering functions are identified at block 630, at block 640, the process can include performing the one or more filtering functions. The one or more filtering functions can be performed to remove noise from motion data (e.g., to remove the magnitude of the 2 ms noise from a motion dataset), as described herein. Block 630 may also include identifying the offset errors mentioned above, in respect to FIGS. 4 and 5, and block 640 may also include correcting collected data based on the offset errors identified at block 630.

In an instance when a set of quiet data includes a signal, for example, at 2 ms with a magnitude of 20 Db and when a set of motion data includes a signal of 2 ms with a magnitude of 100 Db, 80 Db of the spectral content included in the motion dataset may be attributed to 2 ms noise and 20 Db of the spectral content included in the motion dataset may be attributed to 2 ms signal. A filter that removes 80 Db of the 2 ms noise from the motion dataset can be used to generate a filtered dataset that does not include the 80 Db 2 ms noise. In this instance, the noise at 2 ms is four times the magnitude of 2 ms signal, and such levels of noise as compared to the 2 ms signal results in a signal to noise ratio at 2 ms of 0.25. In this instance, when the filtering function is performed to remove the 80 Db of 2 ms noise, an effective signal to noise ratio of a signal could be increased up to a factor of four. Because of this, computers that evaluate sensed data will be able to make determinations that those computers otherwise may be incapable of making.

Figure 7:
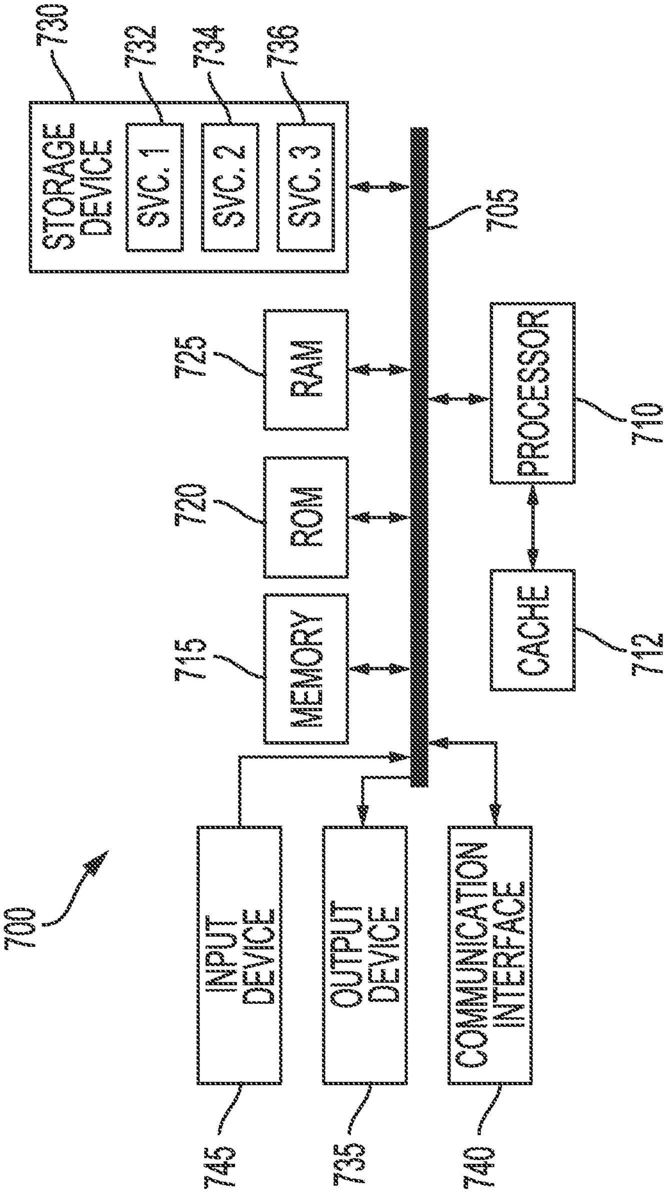
FIG. 7 illustrates an example computing device architecture which can be employed to perform any of the systems and techniques described herein.

FIG. 7 illustrates an example computing device architecture 700 which can be employed to perform any of the systems and techniques described herein. In some examples, the computing device architecture can be integrated with the electromagnetic imager tools described herein. Further, the computing device can be configured to implement the techniques of controlling borehole image blending through machine learning described herein.

The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general-purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Aspects of the disclosure include:

Aspect 1: A method comprising processing a first set of data received from a sensing device to identify a first set of vectors associated with conditions of a wellbore, wherein a wellbore operation induces motion related effects induced into the first set of data. Aspect 1 may also include processing a second set data received from the sensing device to identify a second set of vectors associated with the conditions of the wellbore, wherein the second set of data is received when the wellbore operation is stopped or paused such that the second set of data does not include a portion of the motion related effects induced into the first set of data; identifying a set of offset angles that corresponds to one or more differences between the first set of vectors and the second set of vectors; updating the first set of data based on the set of offset angles that corresponds to the one or more differences between the first set of vectors and the second set of vectors, wherein updates to the first set of data removes the motion related effects induced into the first set of data; and generating a third set of data that includes the updated first set of data such that the third set of data does not include the portion of the motion related effects.

Aspect 2: The method of Aspect 1, further comprising identifying the conditions of the wellbore based on an analysis of the third set of data; and generating a recommendation based on the conditions of the wellbore, wherein a second operation on the wellbore is initiated according to the recommendation.

Aspect 3: The method of Aspect 1 or 2, further comprising receiving the first set of data from the sensing device, wherein the first set of data is received at the sensing device along a first portion of the wellbore when a drill bit drills the first portion of the wellbore; and receiving the second set of data from the sensing device at a second portion of the wellbore, wherein the first set of data is larger than the second set of data and the first set of data is updated based on magnitudes that correspond to the one or more differences between the first set of vectors and the second set of vectors.

Aspect 4: The method of any of Aspect 1 through 3, wherein the processing of the first set of data identifies three different distributions of material properties that include a first material property distribution associated with a porosity, a second material property distribution associated with bound fluids, and a third material property associated with free fluids.

Aspect 5. The method of any of Aspect 1 through 4, wherein a/the first material property distribution corresponds to a first time-decay span of a sensing device timing window; a/the second material property distribution corresponds to a second-decay time span of the sensing device timing window; and a/the third material property distribution corresponds to the third time-decay span of the sensing device timing window.

Aspect 6: The method of any of Aspect 1 through 5, further comprising identifying the first set of vectors, wherein the first set of vectors includes a first micro-porosity vector, a first bound fluids vector, and a first free fluids vector; and identifying the second set of vectors, wherein the second set of vectors includes a second micro-porosity vector, a second bound fluids vector, and a second free fluids vector.

Aspect 7: The method of any of Aspect 1 through 6, wherein the processing of the first set of data includes identifies a plurality of magnitudes associated with the wellbore conditions; and the plurality of porosity magnitudes includes a micro-porosity magnitude, a bound fluids porosity magnitude, and a free fluids porosity magnitude that are each influenced by motion.

Aspect 8: The method of any of Aspect 1 through 7, wherein the motion related effects induced into the first set of data are noise associated with the set of offset angels and a set of magnitudes.

Aspect 9 A non-transitory computer-readable data storage medium having embodied thereon instructions executable by one or more processor that execute a method comprising: processing a first set of data received from a sensing device to identify a first set of vectors associated with conditions of a wellbore, wherein a wellbore operation induces motion related effects induced into the first set of data; processing a second set data received from the sensing device to identify a second set of vectors associated with the conditions of the wellbore, wherein the second set of data is received when the wellbore operation is stopped or paused such that the second set of data does not include the motion related effects; identifying a set of offset angles that corresponds to one or more differences between the first set of vectors and the second set of vectors; updating the first set of data based on the set of offset angles that corresponds to the one or more differences between the first set of vectors and the second set of vectors, wherein updates to the first set of data removes the motion related effects induced into the first set of data;

and generating a third set of data that includes the updated first set of data such that the third set of data does not include the motion related effects.

Aspect 10: The non-transitory computer-readable data storage medium of Aspect 9, wherein the one or more processors execute the instructions to identify the conditions of the wellbore based on an analysis of the third set of data; and generate a recommendation based on the conditions of the wellbore, wherein a second operation on the wellbore is initiated according to the recommendation.

Aspect 11: The non-transitory computer-readable data storage medium of Aspect 9 or 10, wherein the one or more processors execute the instructions to receive the first set of data from the sensing device, wherein the first set of data is received at the sensing device along a first portion of the wellbore when a drill bit drills the first portion of the wellbore; and receive the second set of data from the sensing device at a second portion of the wellbore, wherein the first set of data is larger than the second portion of data and the first set of data is updated based on magnitudes that correspond to the one or more differences between the first set of vectors and the second set of vectors.

Aspect 12: The non-transitory computer-readable data storage medium of any of Aspects 9 through 11, wherein the processing of the first set of data identifies three different distributions of material properties that include a first material property distribution associated with a micro-porosity, a second material property distribution associated with bound fluids porosity, and a third material property associated with free fluids porosity.

Aspect 13: The non-transitory computer-readable data storage medium of any of Aspects 9 through 12, wherein the first material property distribution corresponds to a first time-decay span of a sensing device timing window; the second material property distribution corresponds to a second time-decay span of the sensing device timing window; and the third material property distribution corresponds to the third time-decay span of the sensing device timing window.

Aspect 14: The non-transitory computer-readable data storage medium of any of Aspects 9 through 13, wherein the one or more processors execute the instructions out of the memory to identify the first set of vectors, wherein the first set of vectors includes a first micro-porosity vector, a first bound fluids porosity vector, and a first free fluids porosity vector; and identify the second set of vectors, wherein the second set of vectors includes a second micro porosity vector, a second bound fluids porosity vector, and a second free fluids porosity vector.

Aspect 15: The non-transitory computer-readable data storage medium of any of Aspects 9 through 14, wherein the processing of the first set of data includes identifies a plurality of magnitudes associated with the wellbore conditions; and the plurality of porosity magnitudes includes a micro-porosity magnitude, a bound fluids porosity magnitude, and a free fluids porosity magnitude.

Aspect 16: The non-transitory computer-readable data storage medium of any of Aspects 9 through 15, wherein the motion related effects induced into the first set of data are noise associated with the set of offset angels and a set of magnitudes.

Aspect 17: An apparatus comprising a nuclear magnetic resonance (NMR) sensing device; a memory; and one or more processors that execute instructions out of the memory to: process a first set of data received from the NMR sensing device to identify a first set of vectors associated with conditions of a wellbore, wherein a wellbore operation induces motion related effects into the first set of data; process a second set data received from the NMR sensing device to identify a second set of vectors associated with the conditions of the wellbore, wherein the second set of data is received when the wellbore operation is stopped or paused such that the second set of data does not include a portion of the motion related effects induced into the first set of data; identify a set of offset angles and magnitude differences that corresponds to one or more differences between the first set of vectors and the second set of vectors; update the first set of data based on the set of offset angles that corresponds to the one or more difference between the first set of vectors and the second set of vectors, wherein updates to the first set of data removes the motion related effects induced into the first set of data; and generate a third set of data that includes the updated first set of data such that the third set of data the portion of the motion related effects.

Aspect 18: The apparatus of any of Aspect 17 wherein the one or more processors execute the instructions to: identify the conditions of the wellbore based on an analysis of the third set of data; and generate a recommendation based on the conditions of the wellbore, wherein a second operation on the wellbore is initiated according to the recommendation.

Aspect 19: The apparatus of Aspects 17 or 18, wherein the one or more processors execute the instructions to receive the first set of data from the NMR sensing device, wherein the first set of data is received at the sensing device along a first portion of the wellbore when a drill bit drills the first portion of the wellbore; and receive the second set of data from the sensing device at a second portion of the wellbore, wherein the first set of data is larger than the second set of data and the first set of data is updated based on magnitudes that correspond to the one or more differences between the first set of vectors and the second set of vectors.

Aspect 20: The apparatus of any of Aspects 17 through 19, wherein the processing of the first set of data identifies three different distributions of material properties that include a first material property distribution associated with a micro-porosity, a second material property distribution associated with bound fluids porosity, and a third material property associated with free fluids porosity.

What is claimed is:

1. A method comprising:

processing a first set of data received from a sensing device to identify a first set of vectors associated with conditions of a wellbore, wherein a wellbore operation induces motion related effects induced into the first set of data, wherein the sensing device comprises one of a sonic sensing device, an ultrasonic sensing device, an electromagnetic sensing device, and a nuclear magnetic resonance (NMR) sensing device;

processing a second set data received from the sensing device to identify a second set of vectors associated with the conditions of the wellbore, wherein the second set of data is received when the wellbore operation is stopped or paused such that the second set of data does not include a portion of the motion related effects induced into the first set of data;

identifying a set of offset angles that corresponds to one or more differences between the first set of vectors and the second set of vectors;

updating the first set of data based on the set of offset angles that corresponds to the one or more differences between the first set of vectors and the second set of vectors, wherein updates to the first set of data removes the motion related effects induced into the first set of data; and generating a third set of data that includes the updated first set of data such that the third set of data does not include the portion of the motion related effects.

2. The method of claim 1, further comprising:

identifying the conditions of the wellbore based on an analysis of the third set of data; and generating a recommendation based on the conditions of the wellbore, wherein a second operation on the wellbore is initiated according to the recommendation.

3. The method of claim 1, further comprising:

receiving the first set of data from the sensing device, wherein the first set of data is received at the sensing device along a first portion of the wellbore when a drill bit drills the first portion of the wellbore; and receiving the second set of data from the sensing device at a second portion of the wellbore, wherein the first set of data is larger than the second set of data and the first set of data is updated based on magnitudes that correspond to the one or more differences between the first set of vectors and the second set of vectors.

4. The method of claim 1, wherein the processing of the first set of data identifies three different distributions of material properties that include a first material property distribution associated with a micro-porosity, a second material property distribution associated with bound fluids porosity, and a third material property associated with free fluids porosity.

5. The method of claim 4, wherein:

the first material property distribution corresponds to a first time-decay span of a sensing device timing window;

the second material property distribution corresponds to a second-decay time span of the sensing device timing window; and the third material property distribution corresponds to the third time-decay span of the sensing device timing window.

6. The method of claim 1, further comprising:

identifying the first set of vectors, wherein the first set of vectors includes a first micro-porosity vector, a first bound fluids vector, and a first free fluids vector; and identifying the second set of vectors, wherein the second set of vectors includes a second micro-porosity vector, a second bound fluids vector, and a second free fluids vector.

7. The method of claim 1, wherein:

the processing of the first set of data includes identifies a plurality of magnitudes associated with the wellbore conditions; and the plurality of porosity magnitudes includes a micro-porosity magnitude, a bound fluids porosity magnitude, and a free fluids porosity magnitude that are each influenced by motion.

8. The method of claim 1, wherein the motion related effects induced into the first set of data are noise associated with the set of offset angels and a set of magnitudes.

9. A non-transitory computer-readable data storage medium having embodied thereon instructions executable by one or more processor that execute a method comprising:

processing a first set of data received from a sensing device to identify a first set of vectors associated with conditions of a wellbore, wherein a wellbore operation induces motion related effects induced into the first set of data, wherein the sensing device comprises one of a sonic sensing device, an ultrasonic sensing device, an electromagnetic sensing device, and a nuclear magnetic resonance (NMR) sensing device;

processing a second set data received from the sensing device to identify a second set of vectors associated with the conditions of the wellbore, wherein the second set of data is received when the wellbore operation is stopped or paused such that the second set of data does not include the motion related effects;

identifying a set of offset angles that corresponds to one or more differences between the first set of vectors and the second set of vectors;

updating the first set of data based on the set of offset angles that corresponds to the one or more differences between the first set of vectors and the second set of vectors, wherein updates to the first set of data removes the motion related effects induced into the first set of data; and generating a third set of data that includes the updated first set of data such that the third set of data does not include the motion related effects.

10. The non-transitory computer-readable data storage medium of claim 9, wherein the one or more processors execute the instructions to:

identify the conditions of the wellbore based on an analysis of the third set of data; and generate a recommendation based on the conditions of the wellbore, wherein a second operation on the wellbore is initiated according to the recommendation.

11. The non-transitory computer-readable data storage medium of claim 9, wherein the one or more processors execute the instructions to:

receive the first set of data from the sensing device, wherein the first set of data is received at the sensing device along a first portion of the wellbore when a drill bit drills the first portion of the wellbore; and receive the second set of data from the sensing device at a second portion of the wellbore, wherein the first set of data is larger than the second portion of data and the first set of data is updated based on magnitudes that correspond to the one or more differences between the first set of vectors and the second set of vectors.

12. The non-transitory computer-readable data storage medium of claim 9, wherein the processing of the first set of data identifies three different distributions of material properties that include a first material property distribution associated with a micro-porosity, a second material property distribution associated with bound fluids porosity, and a third material property associated with free fluids porosity.

13. The non-transitory computer-readable data storage medium of claim 12, wherein:

the first material property distribution corresponds to a first time-decay span of a sensing device timing window;

the second material property distribution corresponds to a second time-decay span of the sensing device timing window; and the third material property distribution corresponds to the third time-decay span of the sensing device timing window.

14. The non-transitory computer-readable data storage medium of claim 9, wherein the one or more processors execute the instructions out of the memory to:

identify the first set of vectors, wherein the first set of vectors includes a first micro-porosity vector, a first bound fluids porosity vector, and a first free fluids porosity vector; and identify the second set of vectors, wherein the second set of vectors includes a second micro porosity vector, a second bound fluids porosity vector, and a second free fluids porosity vector.

15. The non-transitory computer-readable data storage medium of claim 9, wherein:

the processing of the first set of data includes identifies a plurality of magnitudes associated with the wellbore conditions; and the plurality of porosity magnitudes includes a micro-porosity magnitude, a bound fluids porosity magnitude, and a free fluids porosity magnitude.

16. The non-transitory computer-readable data storage medium of claim 9, wherein the motion related effects induced into the first set of data are noise associated with the set of offset angels and a set of magnitudes.

17. An apparatus comprising:

a nuclear magnetic resonance (NMR) sensing device;

a memory; and one or more processors that execute instructions out of the memory to:

process a first set of data received from the NMR sensing device to identify a first set of vectors associated with conditions of a wellbore, wherein a wellbore operation induces motion related effects into the first set of data;

process a second set data received from the NMR sensing device to identify a second set of vectors associated with the conditions of the wellbore, wherein the second set of data is received when the wellbore operation is stopped or paused such that the second set of data does not include a portion of the motion related effects induced into the first set of data;

identify a set of offset angles and magnitude differences that corresponds to one or more differences between the first set of vectors and the second set of vectors;

update the first set of data based on the set of offset angles that corresponds to the one or more difference between the first set of vectors and the second set of vectors, wherein updates to the first set of data removes the motion related effects induced into the first set of data; and generate a third set of data that includes the updated first set of data such that the third set of data does not include the motion related effects.

18. The apparatus of claim 17, wherein the one or more processors execute the instructions to:

identify the conditions of the wellbore based on an analysis of the third set of data; and generate a recommendation based on the conditions of the wellbore, wherein a second operation on the wellbore is initiated according to the recommendation.

19. The apparatus of claim 17, wherein the one or more processors execute the instructions to:

receive the first set of data from the NMR sensing device, wherein the first set of data is received at the sensing device along a first portion of the wellbore when a drill bit drills the first portion of the wellbore; and receive the second set of data from the sensing device at a second portion of the wellbore, wherein the first set of data is larger than the second set of data and the first set of data is updated based on magnitudes that correspond to the one or more differences between the first set of vectors and the second set of vectors.

20. The apparatus of claim 17, wherein the processing of the first set of data identifies three different distributions of material properties that include a first material property distribution associated with a micro-porosity, a second material property distribution associated with bound fluids porosity, and a third material property associated with free fluids porosity.

* * * * *